United States Patent
Dhakar

(10) Patent No.: US 9,852,172 B2
(45) Date of Patent: Dec. 26, 2017

(54) FACILITATING HANDLING OF CRASHES IN CONCURRENT EXECUTION ENVIRONMENTS OF SERVER SYSTEMS WHILE PROCESSING USER QUERIES FOR DATA RETRIEVAL

(71) Applicant: Oracle International Corporation, Redwood Shores, CA (US)

(72) Inventor: Ashok Kumar Dhakar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 345 days.

(21) Appl. No.: 14/599,543

(22) Filed: Jan. 19, 2015

(65) Prior Publication Data

US 2016/0078050 A1  Mar. 17, 2016

Related U.S. Application Data

(60) Provisional application No. 62/051,306, filed on Sep. 17, 2014.

(51) Int. Cl.
*G06F 17/30* (2006.01)

(52) U.S. Cl.
CPC .............. *G06F 17/30348* (2013.01)

(58) Field of Classification Search
CPC ......... G06F 17/30554; G06F 17/30864; G06F 3/0481; G06F 17/30572; G06F 3/04842
USPC ......... 707/769, 771, 648; 709/202, 318, 221
See application file for complete search history.

(56) References Cited

U.S. PATENT DOCUMENTS

| | | | |
|---|---|---|---|
| 6,112,304 A * | 8/2000 | Clawson | G06F 9/4875 709/202 |
| 6,247,023 B1 * | 6/2001 | Hsiao | G06F 11/1474 |
| 6,738,928 B1 | 8/2004 | Brown | |
| 7,191,364 B2 | 3/2007 | Hudson et al. | |
| 7,739,553 B2 | 6/2010 | Bendapudi et al. | |

(Continued)

FOREIGN PATENT DOCUMENTS

| CN | 101719090 A | 6/2010 |
|---|---|---|
| CN | 103678109 A | 3/2014 |

OTHER PUBLICATIONS

Diagnosing System Failures with Crash Analyzer, http://technet.microsoft.com/en-us/library/jj713366.aspx, date Nov. 1, 2012, pp. 1-2.

(Continued)

*Primary Examiner* — Hung T Vy
(74) *Attorney, Agent, or Firm* — IPHorizons PLLC; Narendra Reddy Thappeta

(57) ABSTRACT

A server system provided according to an aspect of the present disclosure forms physical queries to process a user query received from a client system. Each physical query is thereafter executed in a corresponding concurrent execution entity (e.g., thread) to retrieve a respective data portion from a corresponding data source. A response to the user query is formed based on the data portions. State information corresponding to each execution entity is logged into log storage. According to another aspect, when a query (either physical or user) causes an execution environment to crash, the identifier of such query is added to a prohibited list. When a new query is to be executed, the initiation of execution of the new query is prevented if the identifier of the new query is present in the prohibited list.

16 Claims, 8 Drawing Sheets

(56) References Cited

U.S. PATENT DOCUMENTS

| | | | |
|---|---|---|---|
| 7,805,636 B2 | 9/2010 | Blanchard et al. | |
| 8,065,319 B2* | 11/2011 | Ding | G06F 17/30516 707/769 |
| 8,280,991 B2* | 10/2012 | Cheshire | H04L 29/12028 709/221 |
| 8,484,243 B2* | 7/2013 | Krishnamurthy | G06F 17/30516 707/771 |
| 8,489,932 B2 | 7/2013 | Hirata | |
| 8,627,475 B2 | 1/2014 | Loveland et al. | |
| 2003/0028509 A1* | 2/2003 | Sah | G06F 17/30595 |
| 2005/0177775 A1* | 8/2005 | Qadeer | G06F 11/3608 714/38.13 |
| 2009/0248631 A1* | 10/2009 | Alba | G06F 17/30522 |
| 2009/0292677 A1* | 11/2009 | Kim | G06F 17/3089 |
| 2010/0146522 A1* | 6/2010 | Duffy | G06F 13/24 719/318 |
| 2012/0144234 A1* | 6/2012 | Clark | G06F 11/0727 714/16 |
| 2012/0323368 A1* | 12/2012 | White, III | H04L 41/0213 700/275 |

OTHER PUBLICATIONS

How to Run the Crash Analyzer on an Enduser Computer, http://technet.microsoft.com/en-us/library/jj713370.aspx, date Nov. 1, 2012, pp. 1-1.

* cited by examiner

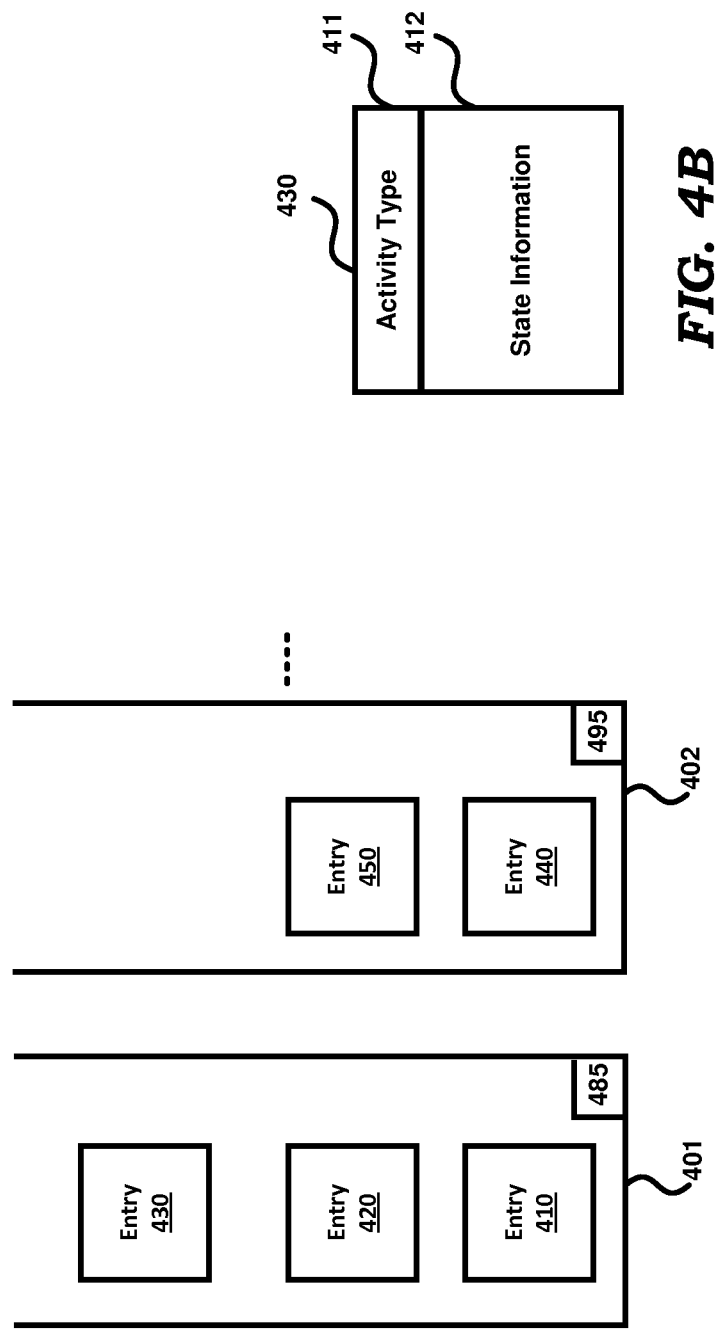

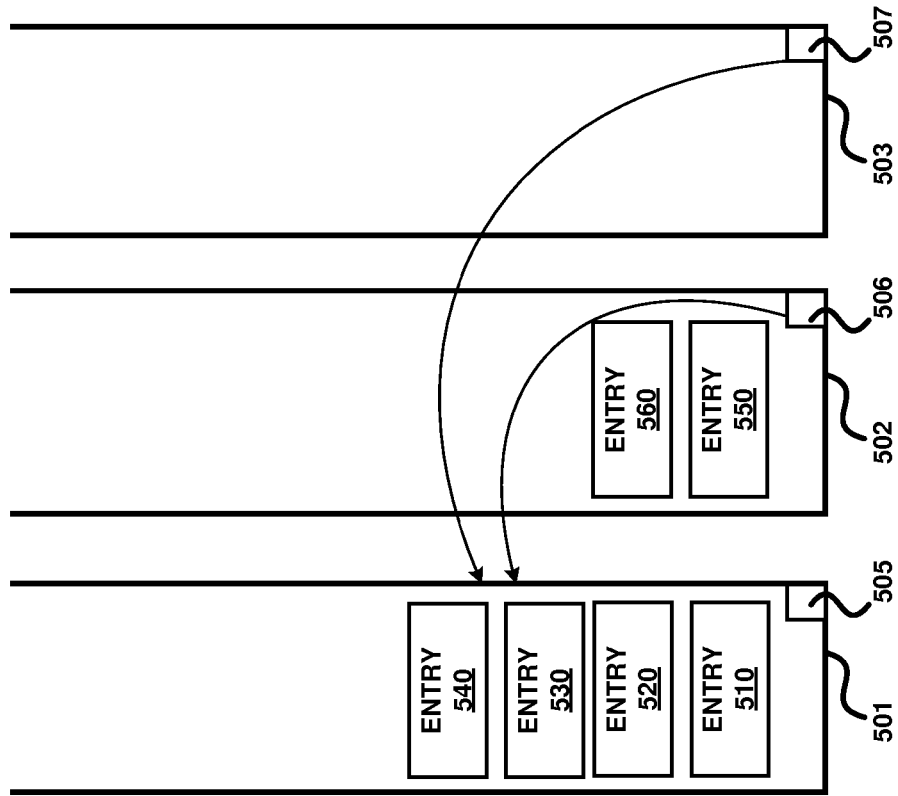
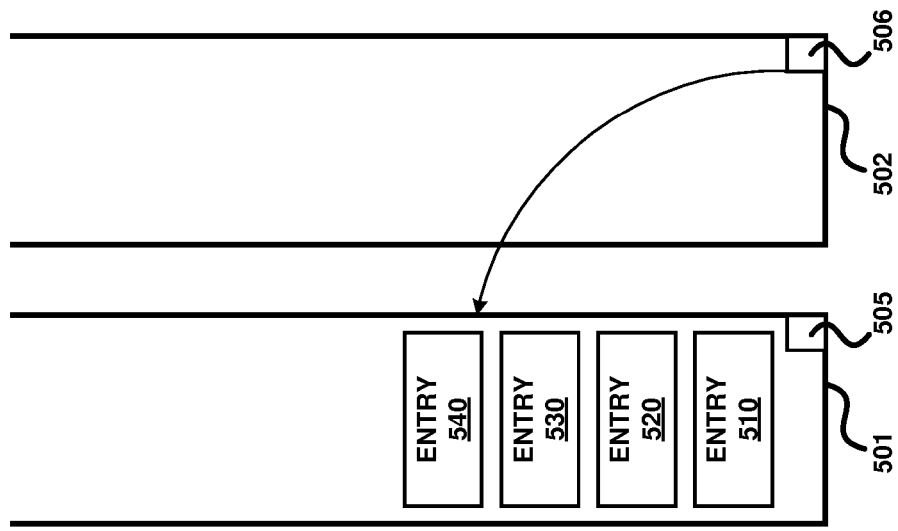

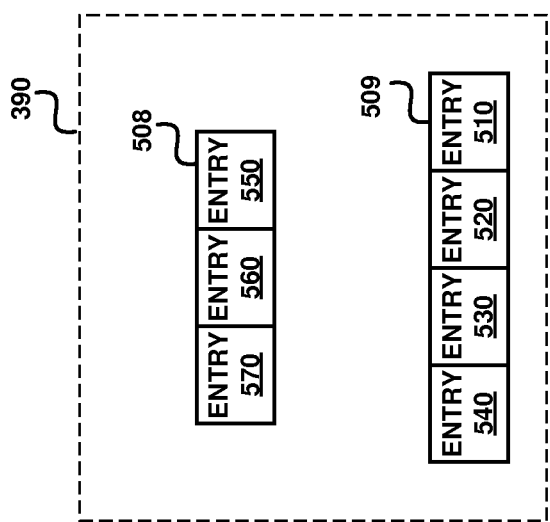
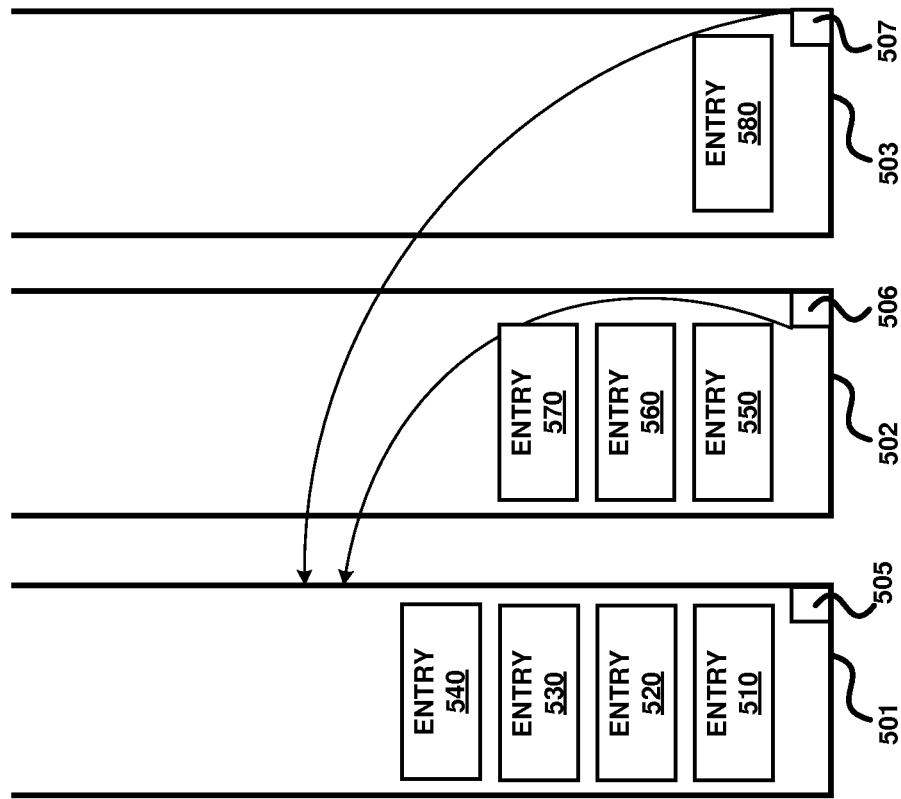
FIG. 5D
FIG. 5C

FACILITATING HANDLING OF CRASHES IN CONCURRENT EXECUTION ENVIRONMENTS OF SERVER SYSTEMS WHILE PROCESSING USER QUERIES FOR DATA RETRIEVAL

RELATED APPLICATION AND PRIORITY CLAIM

The present disclosure claims priority from US Provisional Patent Application having the same title as the subject patent application, assigned Application No. 62/051,306, Filed on: 17 Sep. 2014, and is incorporated in its entirety into the present application, to the extent not inconsistent with the disclosure herein.

BACKGROUND OF THE DISCLOSURE

Technical Field

The present disclosure relates to server systems operating in conjunction with database servers and more specifically to facilitating handling of crashes in concurrent execution environments of such server systems while processing user queries for data retrieval.

Related Art

Server systems are employed to process user queries for data retrieval. In a common scenario, a user (human being) at a client system causes appropriate user queries to be issued, which are received by server systems. The server system may in turn retrieve the data by issuing appropriate database queries to database servers, and provide corresponding responses to user queries.

Server systems are often implemented with concurrent execution environments to process user queries. Concurrent execution implies that multiple execution entities (e.g., threads) are employed to execute respective tasks (related to processing of the query) in parallel. The execution entities are characterized in that each can be scheduled for execution and managed (suspended and resumed, etc.) independently by the operating system. The execution entities can be executed in parallel, for example, by a time-sliced execution of threads, and/or on multiple independent processors executing respective threads.

Concurrent execution provides benefits such as better utilization of various resources in the server system, enhanced throughput performance, etc., as is well known in the relevant arts. Thus, when server system with concurrent execution environment processes user queries, multiple execution entities (executing in parallel) may be employed to process a single user query.

Crashes are occasionally encountered in such concurrent execution environments while processing user queries. A crash refers to a condition in which processing of a user query causes a disruption to the underlying execution environment (e.g., server system malfunctions or stops processing other queries) such that processing of other user queries is thereafter adversely impacted. Typically corrective measures such as restarting/rebooting are thereafter performed, to restore normal processing facilities for the user queries.

Crashes are of concern in concurrent execution environments due to the challenges presented in debugging the error causing the crash, in addition to the disruption to processing noted above. Challenges are presented in debugging, for example, since the problem may not be consistently reproducible in view of the various possibilities with operation of concurrent execution entities.

Aspects of the present disclosure facilitate handling of crashes in such server systems, as described below.

BRIEF DESCRIPTION OF THE DRAWINGS

Example embodiments of the present disclosure will be described with reference to the accompanying drawings briefly described below.

FIG. 4A is a block diagram illustrating the management of status using stacks in an embodiment.

FIG. 4B depicts the details of a stack entry, in an embodiment.

FIG. 5A depicts the details of stack entries in threads and the association of a logical thread with a physical thread in an embodiment.

FIG. 5B depicts the details of stack entries in threads and the association of a logical thread with two physical threads in an embodiment.

FIG. 5C depicts the details of the creation of additional entries in stacks corresponding to logical and physical threads in an embodiment.

FIG. 5D shows log data generated by log management block after a crash in a physical thread.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

A server system provided according to an aspect of the present disclosure, forms physical queries to process a user query received from a client system. Each physical query is thereafter executed in a corresponding concurrent execution entity (e.g., thread) to retrieve a respective data portion from a corresponding data source. A response to the user query is formed based on the data portions. State information corresponding to each execution entity is logged into log storage. The content of the log may be made available upon occurrence of a crash.

In an embodiment, a stack is maintained for logging status information corresponding to each execution entity. Each stack entry may store state information corresponding to a respective activity performed in the thread. Each entry is removed upon completion of the corresponding activity. Thus, when a crash occurs, the entries in the stacks contain state information of at least all the incomplete activities. If there is no crash, the stack is emptied due to completion of all activities related to processing in the thread.

According to another aspect, when a query (either physical or user) causes an execution environment to crash, the identifier of such query is added to a prohibited list. When a new query is to be executed, the initiation of execution of the new query is prevented if the identifier of the new query is present in the prohibited list.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
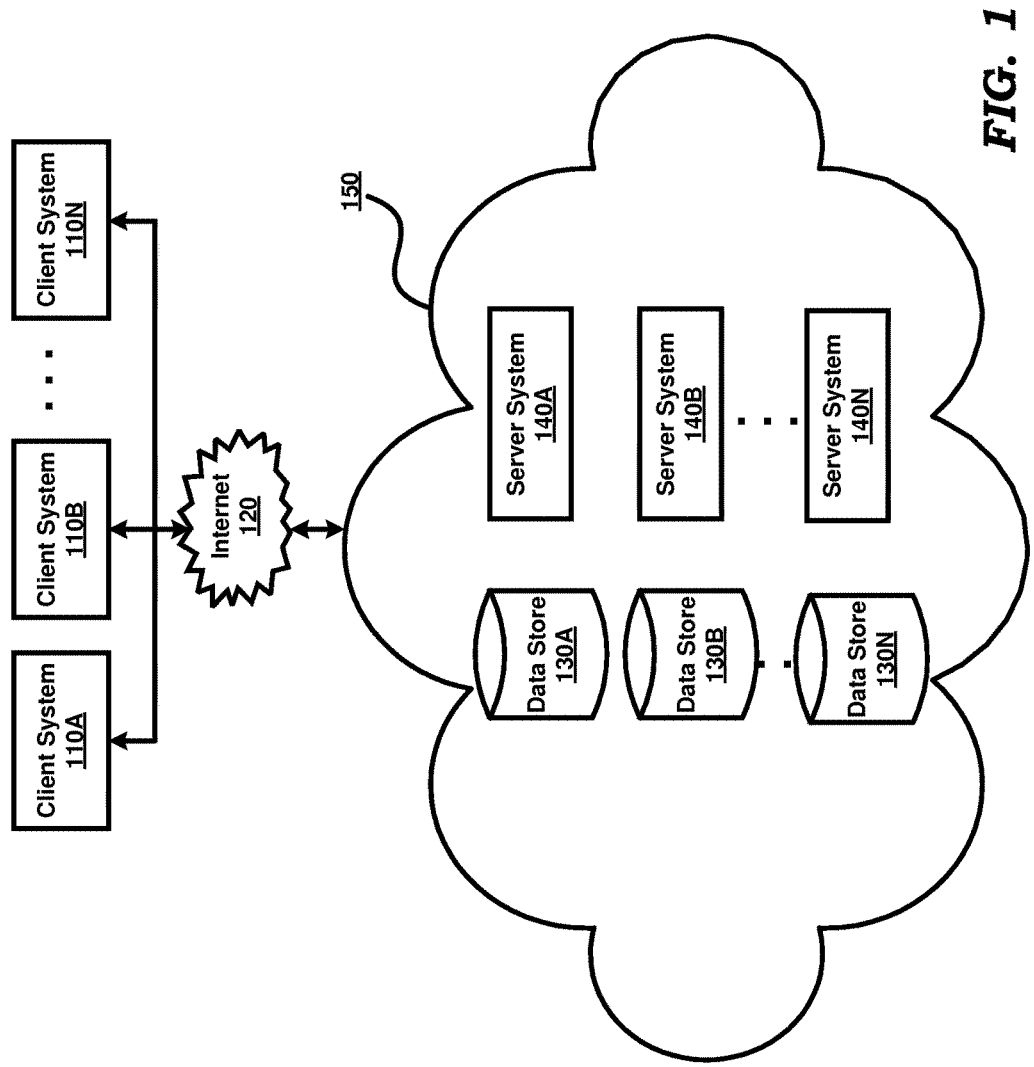
FIG. 1 is a block diagram illustrating an example environment (computing system) in which several aspects of the present disclosure can be implemented.

FIG. 1 is a block diagram illustrating an example environment in which several aspects of the present disclosure can be implemented. The block diagram is shown containing client systems 110A-110N, Internet 120, and cloud 150. Cloud 150 is in turn shown containing data stores 130A-130N and server systems 140A-140N.

Merely for illustration, only representative number/type of systems is shown in FIG. 1. Many environments often contain many more systems, both in number and type, depending on the purpose for which the environment is designed. Each block of FIG. 1 is described below in further detail.

Each of client systems 110A-110N represents a system such as a personal computer, workstation, mobile station, mobile phones, computing tablets, etc., used by users to interact with server systems 140A-140N. In interacting with server systems 140A-140N, a user may cause sending of user queries to server systems 140A-140N and view the output generated by execution of such user queries based on appropriate user interfaces (e.g., web pages).

Internet 120 provides connectivity between client systems 110A-110N and cloud 150 such that each user query and corresponding responses are transferred as corresponding (IP) packets. Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

A (IP) packet is said to be directed to a destination system when the destination IP address of the packet is set to the (IP) address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

Cloud 150 represents a conglomeration of computing and storage systems, in combination with associated infrastructure (including networking/communication technologies, resource management/allocation technologies, etc.) such that the available computing, storage and communication resources are potentially dynamically allocated and/or migrated, for processing of various requests from client systems 110A-110N and for sending corresponding responses.

While cloud 150 is shown with three server systems and three database servers merely for conciseness, it will be readily appreciated that cloud 150 may contain many more servers/systems, potentially in the order of thousands. The computing and storage systems may also be coupled based on IP protocol, though the corresponding connectivity is not shown in FIG. 1.

Each of data stores 130A-130N represents a non-volatile (persistent) storage facilitating storage and retrieval of a corresponding collection of data by applications executing in other systems of the enterprise such as server systems 140A-140N. Data stores 130A-130N may be implemented using database technologies in a known way. Alternatively, some of data stores 130A-130N may be implemented as respective database servers, and some others as file servers providing storage and retrieval of data in the form of files organized as one or more directories, as is well known in the relevant arts.

However, it should be appreciated that processing many queries requires data from more than one data store. Merely for ease of description, it is hereafter assumed that each such data store provides data for processing of a query is a relational database server. However, the data stores may be implemented using other database technologies such as hierarchical database technologies, object oriented databases, etc., or can be of the same technology but from different vendors providing different functional specifications, etc.

Server systems 140A-140N host various applications for processing of user queries received from various client systems. The user query can be in a high-level language, such as Structured Query Language ("SQL"), where portions of the query specify constraints (e.g., wherein clause) for desired data set, and the specific elements (e.g., select clause) of interest in the data set (without having to express lower level details such as storage techniques, etc.). However, alternative formats at similar conceptual level, can be used to specify such requirements, as suited in the corresponding environments, without departing from the scope of and spirit of several aspects of the present disclosure.

Each server system 140A-140N is assumed to provide for concurrent execution of multiple execution entities (e.g., threads). In an embodiment, the server systems are implemented in accordance with "Oracle Business Intelligence Enterprise Edition", available from Oracle Corporation. The applications thus hosted may also provide the appropriate user interfaces for users to generate user queries and view the output of the queries on user systems 110A-110N.

Each user query may be processed (by server systems 140A-140N) based on concurrently executing threads (examples of execution entities). Aspects of the present disclosure facilitate handling of any crashes during such processing, as described below with examples.

3. Processing User Queries

Figure 2:
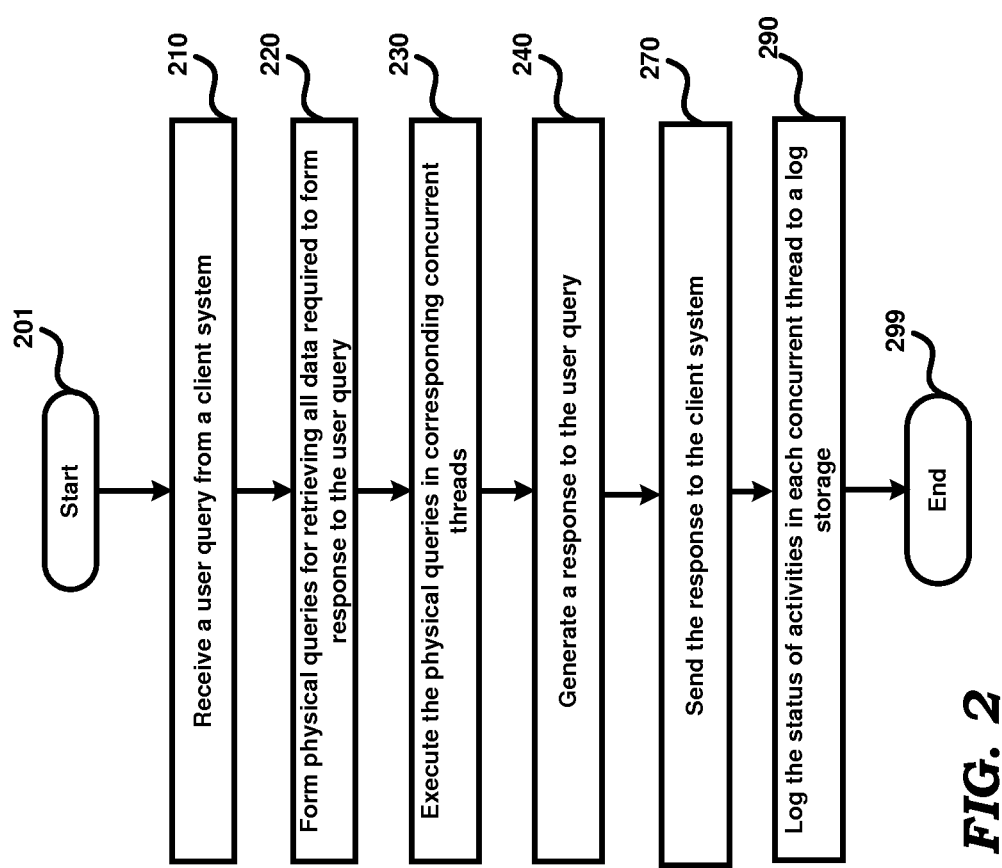
FIG. 2 is a flow chart illustrating the manner in which logs are maintained in concurrent execution environments according to an aspect of the present disclosure.

FIG. 2 is a flow chart illustrating the manner in which user queries are processed according to an aspect of the present disclosure. The steps of the flowchart are described with respect to FIG. 1 merely for illustration. However, the features can be implemented in other systems and environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, server system 140A receives a user query from a client system 110A. For ease of description, the flowchart is described in the context of client system 110A interfacing with server system 140A, even though the features are applicable to other combinations of client systems and server systems.

In step 220, server system 140A forms physical queries, which when executed on respective database servers, cause retrieval of all data required to form a response to the user query. In an embodiment, each physical query is directed to a corresponding database server (consistent with the intereface requirements of the corresponding database server), assuming that different database servers store a corresponding partition of the requisite data. As such, the physical query is generated in a query language that is compatible with the specific database server from which it retrieves data. The physical query may thus be referred to as a database query and the user query as a logical query (which does not concern itself with the physical location of the requisite data).

It may be appreciated that processing of each logical query may cause generation of one or more physical queries, each for a corresponding destination. For example, if a logical query indicates that it is looking for data pertaining to two fiscal years and the data for each of the fiscal years resides on two different database servers, server system 140A may generate one phyiscal query (to database server 130A) indicating that the user needs data retrieved for the first fiscal year, and another physical query (to database server 130B) indicating that the user needs data retrieved for the second fiscal year.

In step 230, server system 140A executes the physical queries in corresponding concurrent threads, causing the corresponding data sets to be retrieved. In step 240, server system 140A generates a response to the user query, based on all such retrieved data sets. In step 270, server system 140A sends a response to the user query of step 210.

In step 290, server system 140A logs the status of activities of each concurrent thread to a log storage. Any desired detail (such as corresponding level of state information at various execution instances) may be logged, as suitable in the corresponding environment or situation (in a way to assist with handling of crashes). While execution of physical threads is described as being performed in corresponding concurrent threads, it should be appreciated that additional concurrent threads can be employed, for example, to perform steps 220, 240 and 270. The status of activities of all such concurrent threads also can be logged, as suited in the corresponding environment.

By thus employing concurrent threads, the efficiency of operation of the user queries is enhanced. At the same time, by logging activities in accordance with the requirement of step 240, the traceability of the various tasks of the physical queries is maintained.

The description is continued with respect to the details of server system 140A in an embodiment.

4. Server System

Figure 3:
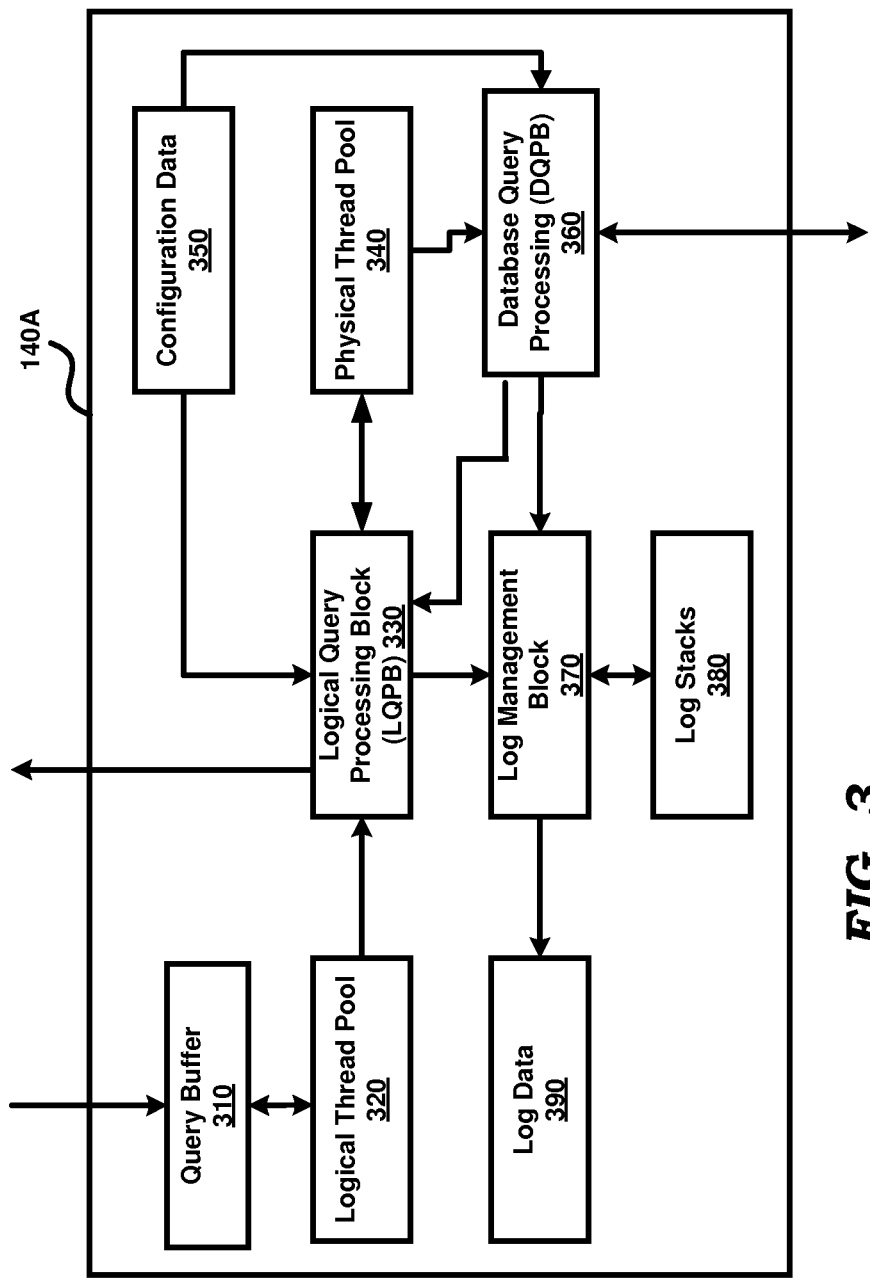
FIG. 3 is a block diagram illustrating the details of a server system in an embodiment.

FIG. 3 is a block diagram illustrating the details of server system 140A in an embodiment. Server system 140A is shown containing query buffer 310, logical thread pool 320, logical query processing block (LQPB) 330, physical thread pool 340, configuration data 350, database query processing block (DQPB) 360, log management block 370, log stacks 380, and log data 390. Each block may be realized as an appropriate combination of hardware, firmware and software, and is described below in further detail.

Query buffer 310 stores logical queries received from client systems 110A-110N. Upon receiving a logical query, query buffer 310 queues up the logical query along with any other queries already in the queue. Query buffer 310 is formed based on memory locations, for example, in a random access memory (RAM).

Logical thread pool 320 contains multiple threads (examples of execution entities), referred to as logical threads, for ease of description, which can be scheduled independently for execution. Assuming a multi-processor environment, threads can be executed concurrently while processing corresponding logical/user queries. A thread executes a stream of instructions to perform a particular task (e.g., processing of a logical query). In the context of logical thread pool 320, each logical thread may execute its copy of the same set of instructions to process the corresponding query. Virtual address space in the RAM for the logical thread pool 320 may be common to and shared by all threads within the pool.

Each thread may be designed to select one of the queued logical queries for processing. Upon completion of processing of the selected logical query, the thread may be designed to select the next queued logical query awaiting processing. Thus, at least the threads processing respective logical queries execute concurrently.

Configuration data 350 maintains metadata information specifying the specific databases storing the corresponding data partitions. As noted in the example above, one database server may store data (partition) corresponding to one year and another database server may store data corresponding to another year. The data available for responding to queries may be partitioned and stored in respective database servers, according to requirements suitable for corresponding environments.

The metadata information may also contain mapping of the query fields in the logical query to fields (e.g., columns in case of relational databases) in the database servers 130A-130N. For example, as described earlier, the logical query may contain constraints (e.g., wherein clause) for the desired data set, and the specific elements (e.g., select clause) of interest in the data set. In this context, the metadata information contained in the configuration data 350 specifies how the elements (e.g., name, id) and the constraints (e.g., age >50) of the logical query map with the fields of the database servers 130A-130N that contain those elements.

Configuration data 350 may also store various data parameters required in accessing the databases accessible using the database queries. The data parameters may include information such as IP address of the destination database server, any required authentication information, port numbers at which database server listens for database queries, etc.

Logical query processing block (LQPB) 330 represents the processing of each logical query by the corresponding logical thread. In an embodiment, LQPB 330 forms database queries from the logical query, with each database query being directed to a single data partition (i.e., database server). The database queries are formed based on information maintained in configuration data 350.

LQPB 330 may receive results of execution of physical/database queries and construct a result corresponding to the logical query. The constructed result is sent (to the client system) as a response to the corresponding logical/user query. LQPB 330 also buffers the queries for suitable processing by physical thread pool 340 and sub-query processing block 360, as described below.

Physical thread pool 340 contains multiple threads (referred to as physical threads, for ease of description) which can execute concurrently while processing corresponding physical/database queries generated by LQPB 330. Each thread may be designed to select one of the queued physical queries for processing. Upon completion of processing of the selected physical query, the thread may be designed to select the next queued physical query awaiting processing. Thus at least the threads processing respective physical queries execute concurrently.

Database query processing block (DQPB) 360 represents the processing of each physical query by the corresponding physical thread. Thus, the physical/database query is issued to the corresponding database/data store (as specified by, and using the information available in configuration data 350). The result of each executed database query is sent to LQPB 330 for further processing.

Log management block 370 generates a log of the details of various activities performed (in 330 and 360) in each of the threads, which simplifies debugging of any crashes. The log is written into log data 390, which may be made available to developers/users trying to resolve the root cause for the crashes.

According to an aspect of the present disclosure, log management block 370 maintains log stacks 380, with each stack corresponding to one of the threads. As described below in further detail, the operation associated with the stacks ensures most relevant state information to be provided upon occurrence of a crash.

5. Stacks

FIG. 4A depicts the general content of log stacks 380 in one embodiment. There are shown stacks 401, 402, etc., with each stack corresponding to activities in a single thread (either of logical thread pool 320 or physical thread pool 340). Stack 401 represents a stack that is associated with a first thread, T1, and stack 402 represents a stack that is associated with a second thread, T2. Each stack is again shown containing multiple entries. The operation of the stacks, including the creation and removal of various entries is described below in further detail.

Log management block 370 creates an entry in a stack upon start of an activity in the thread. An activity generally refers to a block of instructions, which together perform a logical task, as would be understood by developers debugging crashes. Examples of such a logical task can be the entire procedure (method) executing in the thread, of simply a function invoked in the procedure. In view of the stack operation, the entry created first (e.g., 410 and 440) is at lower level compared to entries created later for corresponding activities.

Log management block 370 removes an entry in the stack upon completion of the corresponding activity. Due to the operation of the stack, the entry on top is removed first (e.g., 430 and 450).

Stack 401 corresponding to thread T1 is shown containing three entries 410, 420, and 430, in addition to header 485. The header contains information such as the identity of the parent thread. In case of the thread corresponding to the logical threads, which do not have parent stacks, the header information may be set to NULL reflecting the absence of a parent thread. The presence of such multiple entries may imply that entry 410 (at the lowest level) represents a master/main activity, which has a sub-activity corresponding to entry 420. In other words, completion of the activity corresponding to entry 420 precedes completion of activity corresponding to entry 410. Similarly, activity corresponding to entry 430 may be a sub-activity of activity corresponding to entry 420. Accordingly, due to the operation of the stack, the entry on top is removed first (e.g., 430 and 450).

While an entry is present, any state information characterizing the operations in the activity, values of variables of the activity at different time instances of interest, etc., are stored in the entry. Any information related to the activity that may be helpful for debugging may be stored in the corresponding entry.

FIG. 4B depicts the details of one entry 430, showing activity type 411 and state information 412. The details of entry 430 may be further described by way of a specific example as follows:

Activity Type (411):
"Executing Logical Query"
State Information (412):
Logical Query: "select product.name as product_name, sales.revenue as revenue from product, sales where year=2012";
User:user1;
Query Timeout=100s;
Query Max Memory Limit=512 MB.

While the example shows a particular set of information (i.e., Logical Query, User, Query Timeout, Query Max Memory Limit) as it relates to a specific activity type (Executing Logical Query), it will be apparent to one skilled in the relevant arts by reading the disclosure provided herein that any information related to a particular activity that may be helpful for debugging may be stored in the corresponding entry, as noted above.

In the absence of a crash (i.e., normal operation) due to execution in a thread, the corresponding stack will eventually become empty. However, upon occurrence of a crash in a thread, log management block 370 accesses the entries of the corresponding stack, and writes the information (i.e., 411/412) contained in the entries in log data 390. In addition, the information present in the stack corresponding to the parent (if so, indicated by header 485) is also written to log data 390.

As may be readily appreciated, such information represents minimal information that may be particularly relevant in debugging of the root cause of a crash, since the log information related to successfully completed activities may be already removed. The information thus provided as log data 390 in one scenario is shown in Appendix A below.

Server system 140A can be implemented in accordance with the features above, using various approaches. The description is continued with respect to operation of log management block 370 (i.e., software modules executing based on corresponding processor hardware elements) in some example scenarios.

6. Log management

FIG. 5A depicts details of log stacks 380 as a logical query is processed and execution of a physical query is started, in one embodiment. Log stacks 380 is shown containing stacks 501 and 502. Stack 501 corresponds to a logical thread L1. Stack 501 is shown with a header 505, and entries 510-540, with each of the entries created upon start of a corresponding activity in thread L1.

For example, consider L1 to be a logical thread in logical thread pool 320. L1 accepts a logical query from query buffer 310 and proceeds to execute the logical query in LQPB 330. As L1 starts pre-processing of the logical query (e.g., performing internal validation of the functions in the logical query), three entries 510, 520, and 530, corresponding to three different activities of L1, are formed in stack 501. As L1 executes the logical query to generate a first physical query PQ1 in physical thread pool 340, a fourth entry 540 is formed in stack 501.

Physical thread P1 accepts physical query PQ1 from physical thread pool 340 and proceeds to execute the physical query in DQPB 360. Stack 502 corresponds to physical thread P1. Stack 502 associates (e.g., by making an entry in its header 506) logical thread L1 as the parent thread for physical thread P1.

Referring to FIG. 5B, as physical thread P1 starts pre-processing of the physical query (e.g., to initiate a database connection to a corresponding database that contains data of interest), two entries 550 and 560, corresponding to two different activities of P1, are formed in stack 502.

FIG. 5B also shows stack 503, which corresponds to physical thread P2. Physical thread P2 may accept another physical query (e.g., PQ2) from logical thread L1 via physical thread pool 340. In such a case, stack 503 would associate (e.g., by making an entry in its header 507) logical thread L1 as the parent thread for physical thread P2, as shown in FIG. 5B.

Referring to FIG. 5C, as physical thread P1 executes the first physical query PQ1, a third entry 570, corresponding to the execution activity, is formed in stack 502. In that duration, entry 580 is shown added to stack 503.

Now, assuming there is a crash in the physical thread P1 during the execution of the physical query PQ1, log data 390 is generated by log management block 370.

FIG. 5D depicts logically log data 390 generated by log management block 370, when physical thread P1 crashes while performing activity 570. Specifically, since physical thread P1 crashes, only entries corresponding to physical thread P1 and its parent logical thread L1 are logged by log management block 370. Accordingly, log data 390 shows entries corresponding to the crashed thread P1 (log 508) and its parent thread L1 (log 509).

The text corresponding to log data 390 corresponding to the above crash scenario, in an example scenario, is shown in Appendix A. Specifically, portions of the log of Appendix A marked between "START: Activities Task for Thread: 0x41e63940 [Owner:0x43d19940]" and "END: Activities Task for Thread: 0x41e63940" relate to activities of the crashed physical thread P1 (in stack 502), whereas portions of the log of Appendix A marked between "START: Activities Task for Thread: 0x43d19940" and "END: Activities Task for Thread: 0x43d19940" relate to activities (in stack 501) of the logical thread L1.

As shown in log 508, all entries of physical thread P1 in the corresponding stack 502 up until the point of the crash are recorded (i.e., entries 550-570). In the log of Appendix A, entries 550 and 560 are represented as Activities #1 and #2, shown with Activity Types of 'DBGateway InitCursor' and 'InitCursof'. Entry 580 is represented as Activity #3, shown with Activity Type of 'Producer Executing Query'.

As shown in log 509, all entries of the parent logical thread L1 in the corresponding stack 501 up until the point of crash are recorded (i.e., entries 510-540). Information identifying logical thread L1 as the parent thread (to physical thread P1) was stored in physical thread P1 as described previously. In the log of Appendix A, entries 510-530 are represented as Activities #1, #2, and #3, shown with Activity Types of 'Prepare'. Entry 540 is represented as Activity #4, shown with Activity Type of 'Execute Query'.

The process by which log management block 370 generates logs 508 and 509 is now illustrated. In the event of a crash in physical thread P1, first, log management block 370 reads stack 502 (corresponding to crashed thread P1) to look for one or more entries. If an entry is found, log management block 370 reads the first entry (entry 550). Log management block 370 then writes the activity type and activity information of entry 550 into the corresponding log 508. Next, log management block 370 reads stack 502 to look for a second entry (entry 560). Log management block 370 writes the activity type and activity information of entry 560 into the corresponding log 508. Next, log management block 370 reads stack 502 to look for a third entry (entry 570). Log management block 370 writes the activity type and activity information of entry 570 into the corresponding log 508. Next, log management block 370 reads stack 502 to look for the next entry. Since there are no other entries present in stack 502, log management block 370 completes the writing of log 508.

Log management block 370 then checks the crashed thread P1 (e.g., by reading its header 506) to determine if another thread is associated as its parent thread. Since parent thread L1 is associated with crashed thread P1, log management block 370 writes the entries of the parent thread L1 one-by-one into a corresponding log 509, in a similar fashion as described with the writing of the log for crashed thread P1. Specifically, log management block reads and writes (activity type and activity information) for each of the entries present in stack 501 at the time of crash in thread P1.

Thus, log data 390 details the various activities performed in each of the threads L1 and P1 of log stacks 380 (while executing in LQPB 330 and DQPB 360 respectively) at the time of the crash occurring in physical thread P1.

Now, assuming that there is no crash, stack 501 is eventually emptied and there is no log generated. To illustrate with reference to stack 502 (in the event of no crash) in FIG. 5C, suppose entry 570 represents the last activity that will need to be performed by physical thread P1 prior to completing the execution of physical query PQ1. After the activity corresponding to entry 570 is completed, entry 570 is removed from stack 502. Thereafter, entries 560 and 550 are also removed from stack 502 in that order. Further, any association stored in stack 502 (e.g., an entry in its header 506) associating logical thread L1 as the parent thread for physical thread P1 is also removed. After the entries and the parent-thread association are removed, physical thread P1 is ready to accept another physical query from physical thread pool 340.

From the above, it may be appreciated that a developer may be able to identify the specific activity (in either logical or physical threads) causing a crash. According to an aspect of the present disclosure, execution of queries corresponding to such activities may be subsequently disabled, at least to avoid further crashes, as described below.

7. Query Disabler

Figure 6:
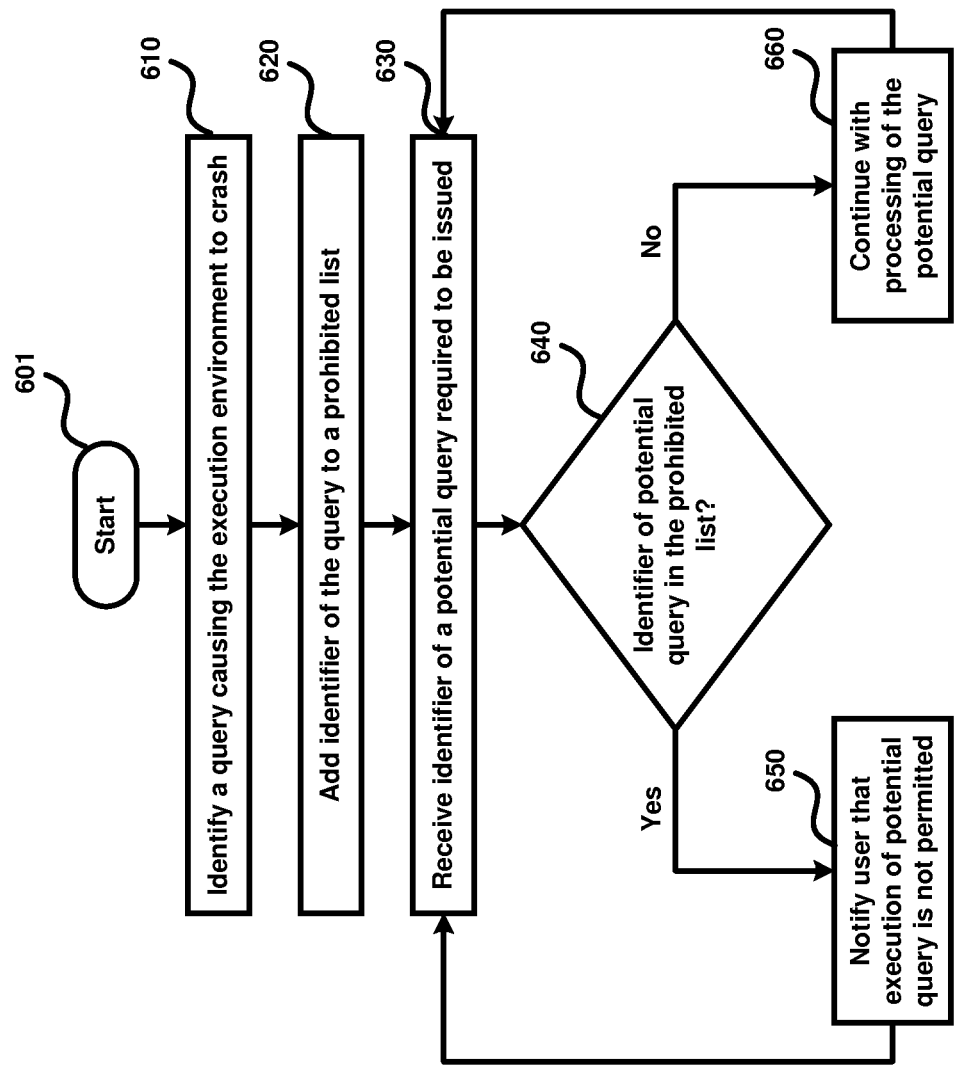
FIG. 6 is a flow chart illustrating the manner in which failed queries are disabled, in an embodiment.

FIG. 6 is a flow chart illustrating the manner in which failed queries are processed according to an aspect of the present disclosure. The steps of the flowchart are described with respect to the above figures merely for illustration. However, the features can be implemented in other systems and environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 601, in which control immediately passes to step 610.

In step 610, server system 140A identifies a query (logical or physical) causing the execution environment to crash. As described above, when a particular query fails as a result of one its activities failing to execute (leading to a crash), a developer or user may use the stored log information (i.e., in log data 390) to identify the particular query that led to the crash. The identification of the failed query (logical or physical) may be performed by examining the identification information stored with respect to each thread (as shown in FIG. 4, e.g., information stored in header 485).

Once the failed query is identified, an identifier of the query is added to a prohibited list, as shown in step 620. Configuration data 350 may store such prohibited list. This identifier may be a numeric or alphanumeric identifier computed using one or more known techniques, such as by applying a hash algorithm to the query.

At step 630, server 140A receives an identifier of a user query from a client system 110A. For ease of description, the flowchart is described in the context of client system 110A interfacing with server system 140A, even though features are applicable to other combinations of client systems and server systems.

At step 640, an identifier of the user query (e.g., computed by applying known techniques, such as a hash algorithm to the query) is compared with the identifiers of the queries contained in the prohibited list. If there is a match, control passes to step 650, where the user issuing the user query is notified that the execution of the user query is not permitted (e.g., due to prior failures). If there no match, control moves to step 660, where the user query is further processed.

Accordingly, future crashes are avoided upon identification of a query, the execution of which has lead to a crash and therefore could lead to future crashes.

It should be appreciated that the features described above can be implemented in various embodiments as a desired combination of one or more of hardware, executable modules, and firmware. The description is continued with respect to an embodiment in which various features are operative when executable modules are executed.

8. Digital Processing System

Figure 7:
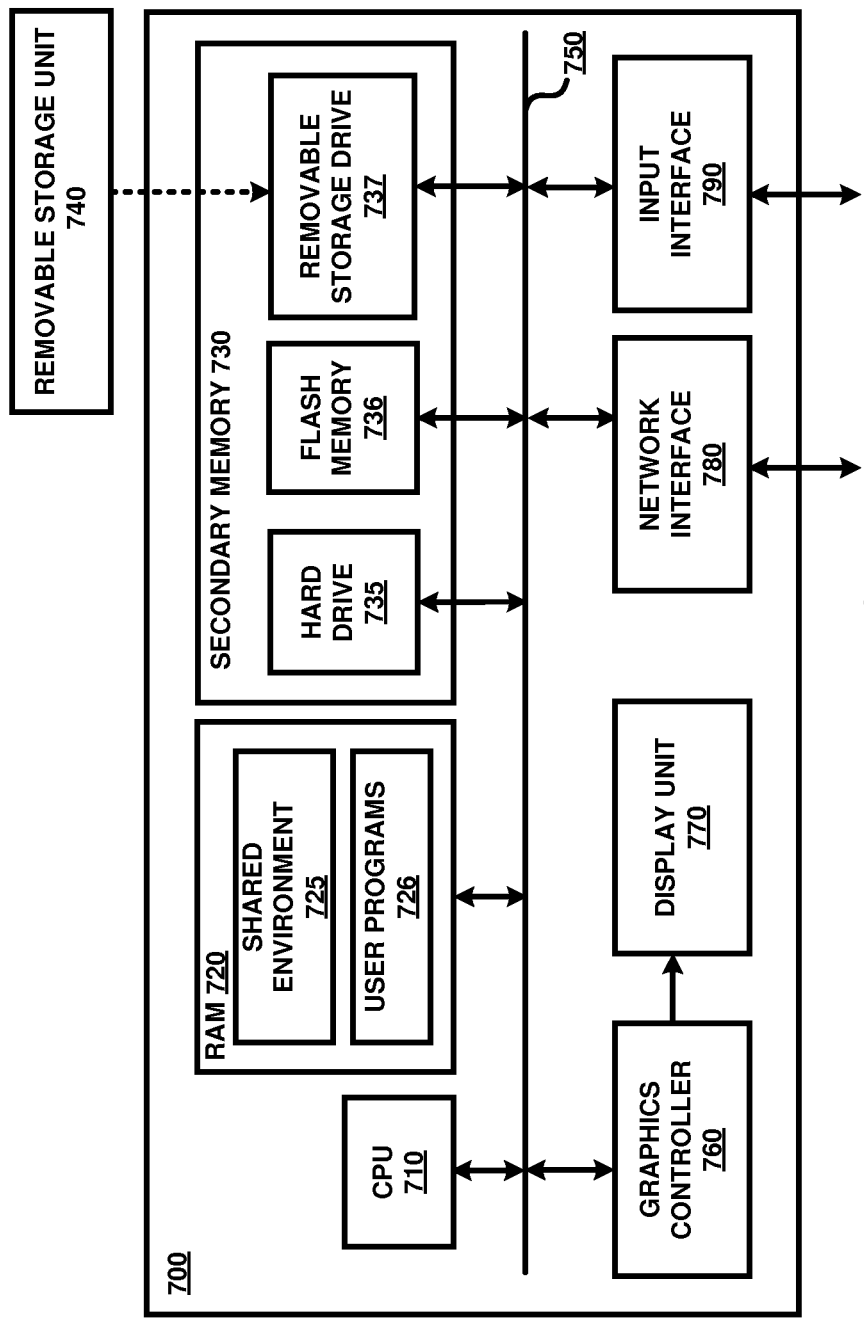
FIG. 7 is a block diagram illustrating the details of a digital processing system in which several aspects of the present invention are operative by execution of appropriate software instructions.

FIG. 7 is a block diagram illustrating the details of digital processing system 700 in which various aspects of the present disclosure are operative by execution of appropriate software instructions. Digital processing system 700 may correspond to server system 140A (or any other system in which the various features disclosed above can be implemented).

Digital processing system 700 may contain one or more processors such as a central processing unit (CPU) 710, random access memory (RAM) 720, secondary memory 727, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions, such as those providing threads and stacks, constituting shared environment 725 and/or user programs 726. Shared environment 725 includes operating systems, device drivers, virtual machines, etc., which provide a (common) run time environment for execution of user programs 726.

Graphics controller 760 generates display signals (e.g., in RGB format) to display unit 770 based on data/instructions received from CPU 710. Display unit 770 contains a display screen to display the images (e.g., those the display screens depicted above) defined by the display signals. Input interface 790 may correspond to a keyboard and a pointing device (e.g., touch-pad, mouse) and may be used to provide inputs. Network interface 780 provides connectivity to a network (e.g., using Internet Protocol), and may be used to communicate with other systems (such as those shown in FIG. 1) connected to the network.

Secondary memory 730 may contain hard drive 735, flash memory 736, and removable storage drive 737. Secondary memory 730 may store the data software instructions (e.g., for performing the actions noted above with respect to FIG. 2), which enable digital processing system 700 to provide several features in accordance with the present disclosure.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EEPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

APPENDIX

```
================================================================
Miscellaneous Information
================================================================
DB Max Execution Time:0
DBGateway Max Rows:0
DBGateway Max Threads:200
Listen Port:9703
MAXIMUM_FILE_HANDLES:540
Machine:slc04ysh.us.oracle.com
Max Session Limit:2000
Monitor Port:9701
Number of Processors:2
ORACLE_BI_LANG:en
ORACLE_HOME:/ade/adhakar_test/biserver/analytics/jambuild.linux.64/orahome
ORACLE_INSTANCE:/ade/adhakar_test/biserver/analytics/jambuild.linux.64/
orahome
Repositories:{Star=/ade/adhakar_test/biserver/analytics/jambuild.linux.64/
orainst/bifoundation/OracleBIServerComponent/coreapplication_obis1/
repository/northwind.rpd}
SQLBypass Max Threads:200
Server Max Threads:100
Server Thread Stack Size:1048576
Session TimeOut(Secs):60
Unique Identifier:instance1:coreapplication_obis1
================================================================
Beginning of crash dump . . .
Signal: 11
================================================================
START: Activities Task for Thread: 0x41e63940 [Owner:0x43d19940]
Activity #1 ECID:004zqjPTqpO9xW73VJVKB80002A0003EWG
================================================================
Activity type: DbGateway InitCursor
DSN:Northwind Connections;userName:northwind
Physcial SQL Hash:ox525b82c
Physical SQL:WITH SAWITH0 AS (select T492944.C172573801 as c1 from
(SELECT V56424546.ASSIGNMENT_STATUS_TYPE_ID AS C172573801,
V56424546.ASSIGNMENT_ID776 AS PKA_AssignmentPEOAssignmentId0,
V56424546.EFFECTIVE_START_DATE785 AS PKA_AssignmentPEOEffectiveSta0,
V56424546.EFFECTIVE_END_DATE794 AS PKA_AssignmentPEOEffectiveEnd0,
V56424546.EFFECTIVE_LATEST_CHANGE AS PKA_AssignmentPEOEffectiveLat0,
V56424546.EFFECTIVE_SEQUENCE AS PKA_AssignmentPEOEffectiveSeq0 FROM
(SELECT PersonPEO.PERSON_ID AS PERSON_ID271,
AssignmentPEO.ASSIGNMENT_ID AS ASSIGNMENT_ID776,
AssignmentPEO.EFFECTIVE_START_DATE AS EFFECTIVE_START_DATE785,
AssignmentPEO.EFFECTIVE_END_DATE AS EFFECTIVE_END_DATE794,
AssignmentPEO.EFFECTIVE_LATEST_CHANGE,
AssignmentPEO.EFFECTIVE_SEQUENCE,
AssignmentPEO.ASSIGNMENT_STATUS_TYPE_ID FROM PER_PERSONS PersonPEO,
PER_ALL_PEOPLE_F PersonDetailsPEO, PER_ALL_ASSIGNMENTS_M AssignmentPEO
WHERE (PersonPEO.PERSON_ID = PersonDetailsPEO.PERSON_ID AND
```

APPENDIX-continued

PersonDetailsPEO.PERSON_ID = AssignmentPEO.PERSON_ID AND ( DATE'2014-07-30'    BETWEEN PersonDetailsPEO.EFFECTIVE_START_DATE AND PersonDetailsPEO.EFFECTIVE_END_DATE) AND ( DATE'2014-07-30'    BETWEEN AssignmentPEO.EFFECTIVE_START_DATE AND AssignmentPEO.EFFECTIVE_END_DATE)) AND ( (((  1 = 2 ) OR (EXISTS ((SELECT 1 FROM PER_ALL_ASSIGNMENTS_M A WHERE ROWNUM>0 AND A.ASSIGNMENT_TYPE IN ('E','C','N','P') AND A.EFFECTIVE_LATEST_CHANGE='Y' AND TRUNC(SYSDATE) BETWEEN A.EFFECTIVE_START_DATE AND A.EFFECTIVE_END_DATE AND A.PERSON_ID=PersonPEO.PERSON_ID AND ( NOT EXISTS (SELECT 1 FROM PER_USERS U WHERE U.PERSON_ID=A.PERSON_ID AND U.USER_GUID=FND_GLOBAL.USER_GUID ) AND (( A.ASSIGNMENT_ID IS NOT NULL AND EXISTS (SELECT 1 FROM PER_MANAGER_HRCHY_DN MH WHERE MH.PERSON_ID=A.PERSON_ID AND TRUNC(SYSDATE) BETWEEN MH.EFFECTIVE_START_DATE AND MH.EFFECTIVE_END_DATE AND MH.MANAGER_ID = (SELECT U.PERSON_ID FROM PER_USERS U WHERE U.USER_GUID=FND_GLOBAL.USER_GUID) AND MH.MANAGER_TYPE = 'LINE_MANAGER' ) ))))UNION ALL SELECT 1 FROM PER_SHARE_INFORMATION SI WHERE SI.GRANTEE_PERSON_ID = (SELECT U.PERSON_ID FROM PER_USERS U WHERE U.USER_GUID=FND_GLOBAL.USER_GUID ) AND SI.PERSON_ID = PersonPEO.PERSON_ID ))))    AND ( ( (AssignmentPEO.EFFECTIVE_LATEST_CHANGE = 'Y' ) )    AND ((    ( (AssignmentPEO.ASSIGNMENT_TYPE = 'E' ) )    OR ( (AssignmentPEO.ASSIGNMENT_TYPE = 'C' ) )    OR ( (AssignmentPEO.ASSIGNMENT_TYPE = 'N' ) )    OR ( (AssignmentPEO.ASSIGNMENT_TYPE = 'P' ) )    )) ) )) V56424546) T492944), SAWITH1 AS (select distinct D1.c1 as c1,    cast(D1.c1 as    VARCHAR ( 80 ) ) as c4 from    SAWITH0 D1), SAWITH2 AS (select T492945.C61833496 as c1,    T492945.C510542816 as c2 from    (SELECT V308947565.USER_STATUS AS C61833496, V308947565.ASSIGNMENT_STATUS_TYPE_ID AS C510542816, V308947565.LANGUAGE AS C317595872 FROM PER_ASSIGNMENT_STATUS_TYPES_TL V308947565 WHERE ( ( (V308947565.LANGUAGE = 'US' ) ) )) T492945), SAWITH3 AS (select D1.c1 as c1,    D2.c1 as c2,    D1.c4 as c3 from SAWITH1 D1 left outer join SAWITH2 D2 On D1.c1 = D2.c2 where   ( nvl(D2.c1, D1.c4) = 'Active - Payroll Eligible' ) ), SAWITH4 AS (select D901.c1 as c1,    nvl(D901.c2 , D901.c3) as c2 from    SAWITH3 D901) select distinct D1.c1 as c1,    D1.c2 as c2,    D1.c1 as c3 from SAWITH4 D1 order by c1, c2

==================================================
Activity #2 ECID:004zqjPTqpO9xW73VJVKB80002A0003EWG
==================================================
Activity type: InitCursor
Execution Projection: <<62493>> Projection;Logical Hash:oxbf1d29d9
==================================================
Activity #3 ECID:004zqjPTqpO9xW73VJVKB80002A0003EWG
==================================================
Activity type: Producer Executing Query
Repository Name:Star Subject Area Name:SnowflakeSales User Name:weblogic
==================================================
END: Activities Task for Thread: 0x41e63940
==================================================
START: Activities Task for Thread: 0x43d19940
Activity #1 ECID:004zqjPTqpO9xW73VJVKB80002A0003EWG
==================================================
Activity type: Prepare
Execution Projection: <<62551>> Projection;Logical Hash:oxbf1d29d9
==================================================
Activity #2 ECID:004zqjPTqpO9xW73VJVKB80002A0003EWG
==================================================
Activity type: Prepare
Execution Projection: <<62276>> Projection;Logical Hash:oxbf1d29d9
==================================================
Activity #3 ECID:004zqjPTqpO9xW73VJVKB80002A0003EWG
==================================================
Activity type: Prepare
Execution Projection: <<62467>> Projection;Logical Hash:oxbf1d29d9
==================================================
Activity #4 ECID:004zqjPTqpO9xW73VJVKB80002A0003EWG
==================================================
Activity type: Execute Query
Repository Name: Star
Catalog: SnowflakeSales_subrequest
User: weblogic
Session ID: 0xa7b70000
Request ID: 0xa7b70002
Logical Hash:oxbf1d29d9
Logical SQL:SET VARIABLE QUERY_SRC_CD='DisplayValueMap',PREFERRED_CURRENCY='Local Currency';SELECT DESCRIPTOR_IDOF("Worker"."Assignment Status") saw_0, "Worker"."Assignment Status" saw_1, DESCRIPTOR_IDOF("Workforce Performance – Performance Task Status Real Time"."Worker"."Assignment Status") saw_2 FROM "Workforce APPENDIX-continued Performance – Performance Task Status Real Time" WHERE
"Worker"."Assignment Status" = 'Active – Payroll Eligible' ORDER BY
saw_0, saw_1
==================================================================
    END: Activities Task for Thread: 0x43d19940
==================================================================
    BACKTRACE:
        /ade/adhakar_test/biserver/analytics/jambuild.linux.64/orahome/bifoundation/
server/bin/libnqutilityserver64.so[0x2b9d878375f3]
        /ade/adhakar_test/biserver/analytics/jambuild.linux.64/orahome/bifoundation/
server/bin/libnqutilityserver64.so[0x2b9d8783781f]
        /lib64/libpthread.so.0[0x3f39a0ebe0]
        /ade/adhakar_test/biserver/analytics/jambuild.linux.64/orahome/bifoundation/
server/bin/libnqsdbgateway64.so(_ZN11NQDbGateway10InitCursorEv+
0x6b2)[0x2b9d7da0522a]
        /ade/adhakar_test/biserver/analytics/jambuild.linux.64/orahome/bifoundation/
server/bin/libnqcachestorage64.so(_ZN22CacheStorageListStream10Init
CursorEv+0x57)[0x2b9d7bfa4ad7]
        /ade/adhakar_test/biserver/analytics/jambuild.linux.64/orahome/bifoundation/
server/bin/libnqsexecutionlist64.so(_ZN12NQProjection10InitCursor
Ev+0x82)[0x2b9d7e9fdde0]
        /ade/adhakar_test/biserver/analytics/jambuild.linux.64/orahome/bifoundation/
server/bin/libnqsexecutionlist64.so(_ZN8Producer11ExecuteOnceEv+
0xc37)[0x2b9d7e9e8ca5]
        /ade/adhakar_test/biserver/analytics/jambuild.linux.64/orahome/bifoundation/
server/bin/libnqsexecutionlist64.so(_ZN13QueryProducer7ProduceEv+
0x15)[0x2b9d7e9e9543]
        /ade/adhakar_test/biserver/analytics/jambuild.linux.64/orahome/bifoundation/
server/bin/libnqsexecutionlist64.so(_ZN18NQThreadJob_NoArgsI8Producer
E15ExecuteUserMainEv+0xb0)[0x2b9d7e9eda28]
        /ade/adhakar_test/biserver/analytics/jambuild.linux.64/orahome/bifoundation/
server/bin/libnqutilitygeneric64.so(_ZN16NQExecutionState17Execute
SystemMainEv+0xa5)[0x2b9d87333ec5]
        /ade/adhakar_test/biserver/analytics/jambuild.linux.64/orahome/bifoundation/
server/bin/libnqutilitygeneric64.so(_ZN15NQThreadJobBase17Execute
SystemMainEv+0x47)[0x2b9d87393b09]
        nqsserver(_ZN17ManagedJobFunctorclEv+0x34)[0x40efbc]
        /ade/adhakar_test/biserver/analytics/jambuild.linux.64/orahome/bifoundation/
server/bin/libnqutilitygeneric64.so(_ZN10PoolThread15ExecuteUserMain
Ev+0x1db)[0x2b9d87394add]
        /ade/adhakar_test/biserver/analytics/jambuild.linux.64/orahome/bifoundation/
server/bin/libnqutilitygeneric64.so(_ZN16NQExecutionState17Execute
SystemMainEv+0xa5)[0x2b9d87333ec5]
        /ade/adhakar_test/biserver/analytics/jambuild.linux.64/orahome/bifoundation/
server/bin/libnqutilitygeneric64.so(_ZN8NQThread17ExecuteSystemMain
Ev+0x59)[0x2b9d87392cd5]
        /ade/adhakar_test/biserver/analytics/jambuild.linux.64/orahome/bifoundation/
server/bin/libnqutilitygeneric64.so(_ZN8NQThread15ThreadMainEntry
EPv+0x30)[0x2b9d87392ada]
        /lib64/libpthread.so.0[0x3f39a0677d]
        /lib64/libc.so.6(clone+0x6d)[0x3f38ed49ad]
==================================================================

What is claimed is:

1. A method performed in a server system, said method comprising:

receiving a user query from a client system;

forming physical queries from said user query, each physical query for retrieving a portion of data required to form response to said user query;

executing each of said physical queries in a corresponding concurrent execution entity of a plurality of execution entities to receive the respective portions of said data;

generating a response to said user query based on said respective portions if there is no occurrence of a crash during said executing;

sending said response to said client system if there is no occurrence of a crash during said executing;

during said executing, logging status of activities initiated for execution of the respective physical query in each concurrent execution entity to a log storage, wherein said status indicates whether performance of any of said activities is not completed, wherein said logging comprises:

maintaining a respective stack for each concurrent execution entity such that a first stack is maintained for a first concurrent execution entity of said plurality of execution entities;

adding a corresponding entry to said first stack upon initiation of each activity in said first concurrent execution entity, wherein each entry maintains a state information related to the corresponding activity, wherein said first stack includes a first entry corresponding to a first activity and a second entry corresponding to a second activity; and removing said second entry from said first stack upon completion of said corresponding second activity, wherein unremoved entries in said first stack at said time instance correspond to the not yet completed activities in said first concurrent execution entity as of said time instance;

receiving an indication of occurrence of a crash of said first execution entity at a time instance during said executing; and in response to said indication, providing content of each entry in said first stack to an administrator for debugging purpose as status with respect to activities not yet completed in said first execution entity until said time instance.

2. The method of claim 1, wherein said first execution entity processes a first physical query, wherein said user query is processed in a second execution entity also executing concurrent with said first execution entity, wherein said method further comprises:

maintaining a parent stack for logging activities related to processing of said user query in said second execution entity; and including a pointer from said first stack to said parent stack.

3. The method of claim 2, wherein said providing further comprising:

providing content of each entry in said parent stack corresponding to said second execution entity, wherein said content of said parent stack represents status information with respect to all activities not yet completed in said second execution entity until said time instance.

4. The method of claim 3, wherein each of said first execution entity and said second execution entity is a thread.

5. The method of claim 1, wherein a first portion of data maintained in a first database server and a second portion of data maintained in a second database server, wherein said executing comprises:

connecting to said first database server to retrieve said first portion of data; and connecting to said second database server to retrieve said second portion of data.

6. A non-transitory machine readable medium storing one or more sequences of instructions for enabling a server system to facilitate handling of crashes, wherein execution of said one or more instructions by one or more processors contained in said server system enables said server system to perform the actions of:

receiving a user query from a client system;

forming physical queries from said user query, each physical query for retrieving a portion of data required to form response to said user query;

executing each of said physical queries in a corresponding concurrent execution entity of a plurality of execution entities to receive the respective portions of said data;

generating a response to said user query based on said respective portions if there is no occurrence of a crash during said executing;

sending said response to said client system if there is no occurrence of a crash during said executing;

during said executing, logging status of activities initiated for execution of the respective physical query in each concurrent execution entity to a log storage, wherein said status indicates whether performance of any of said activities is not completed, wherein said logging comprises:

maintaining a respective stack for each concurrent execution entity such that a first stack is maintained for a first concurrent execution entity of said plurality of execution entities;

adding a corresponding entry to said first stack upon initiation of each activity in said first concurrent execution entity, wherein each entry maintains a state information related to the corresponding activity, wherein said first stack includes a first entry corresponding to a first activity and a second entry corresponding to a second activity; and removing said second entry from said first stack upon completion of said corresponding second activity, wherein unremoved entries in said first stack at said time instance correspond to the not yet completed activities in said first concurrent execution entity as of said time instance;

receiving an indication of occurrence of a crash of said first execution entity at a time instance during said executing; and in response to said indication, providing content of each entry in said first stack to an administrator for debugging purpose as status with respect to activities not yet completed in said first execution entity until said time instance.

7. The non-transitory machine readable medium of claim 6, wherein said first execution entity processes a first physical query, wherein said user query is processed in a second execution entity also executing concurrent with said first execution entity, wherein said actions further comprise:

maintaining a parent stack for logging activities related to processing of said user query in said second execution entity; and including a pointer from said first stack to said parent stack.

8. The non-transitory machine readable medium of claim 7, wherein said providing further comprising:

providing content of each entry in said parent stack corresponding to said second execution entity, wherein said content of said parent stack represents status information with respect to all activities not yet completed in said second execution entity until said time instance.

9. The non-transitory machine readable medium of claim 8, wherein each of said first execution entity and said second execution entity is a thread.

10. A server system comprising:

one or more random access memories (RAMs) to store instructions;

one or more processing units to retrieve said instructions from said RAMs and execute the retrieved instructions, wherein execution of said instructions causes said server system to perform the actions of:

receiving a user query from a client system;

forming physical queries from said user query, each physical query for retrieving a portion of data required to form response to said user query;

executing each of said physical queries in a corresponding concurrent execution entity of a plurality of execution entities to receive the respective portions of said data;

generating a response to said user query based on said respective portions if there is no occurrence of a crash during said executing;

sending said response to said client system if there is no occurrence of a crash during said executing; and during said executing, logging status of activities initiated for execution of the respective physical query in each concurrent execution entity to a log storage, wherein said status indicates whether performance of any of said activities is not completed, wherein said logging comprises:

maintaining a respective stack for each concurrent execution entity such that a first stack is maintained for a first concurrent execution entity of said plurality of execution entities;

adding a corresponding entry to said first stack upon initiation of each activity in said first concurrent execution entity, wherein each entry maintains a state information related to the corresponding activity, wherein said first stack includes a first entry corresponding to a first activity and a second entry corresponding to a second activity; and removing said second entry from said first stack upon completion of said corresponding second activity, wherein unremoved entries in said first stack at said time instance correspond to the not yet completed activities in said first concurrent execution entity as of said time instance;

receiving an indication of occurrence of a crash of said first execution entity at a time instance during said executing; and in response to said indication, providing content of each entry in said first stack to an administrator for debugging purpose as status with respect to activities not yet completed in said first execution entity until said time instance.

11. The server system of claim 10, wherein said first execution entity processes a first physical query, wherein said user query is processed in a second execution entity also executing concurrent with said first execution entity, wherein said actions further comprise:

maintaining a parent stack for logging activities related to processing of said user query in said second execution entity; and including a pointer from said first stack to said parent stack.

12. The server system of claim 11, wherein said providing further comprising:

providing content of each entry in said parent stack corresponding to said second execution entity, wherein said content of said parent stack represents status information with respect to all activities not yet completed in said second execution entity until said time instance.

13. The server system of claim 12, wherein each of said first execution entity and said second execution entity is a thread.

14. A method of handling crashes, said method comprising:

identifying a set of queries that have caused an execution environment to crash before a first time instance;

adding respective identifiers of said set of queries to a prohibited list, wherein said respective identifiers are in said prohibited list by said first time instance;

receiving, after said first time instance, a second identifier of a potential query to be issued;

determining whether said prohibited list contains said second identifier by comparing said second identifier with said respective identifiers in said prohibited list;

preventing execution of said potential query if said prohibited list contains said second identifier.

15. A non-transitory machine readable medium storing one or more sequences of instructions for enabling a server system to facilitate handling of crashes, wherein execution of said one or more instructions by one or more processors contained in said server system enables said server system to perform the actions of:

identifying a set of queries that have caused an execution environment to crash before a first time instance;

adding respective identifiers of said set of queries to a prohibited list, wherein said respective identifiers are in said prohibited list by said first time instance;

receiving, after said first time instance, a second identifier of a potential query to be issued;

determining whether said prohibited list contains said second identifier by comparing said second identifier with said respective identifiers in said prohibited list;

preventing execution of said potential query if said prohibited list contains said second identifier.

16. A server system comprising:

one or more random access memories (RAMs) to store instructions;

one or more processing units to retrieve said instructions from said RAMs and execute the retrieved instructions, wherein execution of said instructions causes said server system to perform the actions of:

identifying a set of queries that have caused an execution environment to crash before a first time instance;

adding respective identifiers of said set of queries to a prohibited list, wherein said respective identifiers are in said prohibited list by said first time instance;

receiving, after said first time instance, a second identifier of a potential query to be issued;

determining whether said prohibited list contains said second identifier by comparing said second identifier with said respective identifiers in said prohibited list;

preventing execution of said potential query if said prohibited list contains said second identifier.

\* \* \* \* \*

UNITED STATES PATENT AND TRADEMARK OFFICE
CERTIFICATE OF CORRECTION

PATENT NO.       : 9,852,172 B2
APPLICATION NO.  : 14/599543
DATED            : December 26, 2017
INVENTOR(S)      : Dhakar It is certified that error appears in the above-identified patent and that said Letters Patent is hereby corrected as shown below:

In the Specification

In Column 5, Line 19, delete "intereface" and insert -- interface --, therefor.

In Column 5, Line 34, delete "phyiscal" and insert -- physical --, therefor.

In Column 11, Line 40, delete "lead" and insert -- led --, therefor.

In Column 13-14, under (APPENDIX), Line 34, delete "Physcial" and insert -- Physical --, therefor.

In Column 17, Lines 16-17, delete "Init CursorEv" and insert -- InitCursorEv --, therefor.

Signed and Sealed this
Tenth Day of July, 2018

Andrei Iancu
*Director of the United States Patent and Trademark Office*